United States Patent
Mah et al.

(10) Patent No.: US 6,695,762 B1
(45) Date of Patent: Feb. 24, 2004

(54) FLUID COOLED PRESSURE GARMENT

(75) Inventors: Donald Mah, Richmond (CA); Paul Higginbotham, Richmond (CA); Jason Bryan Leggatt, Delta (CA); Ping Yin Sheu, Delta (CA)

(73) Assignee: Mustang Survival Corp, Richmond (CA)

( * ) Notice: Subject to any disclaimer, the term of this patent is extended or adjusted under 35 U.S.C. 154(b) by 0 days.

(21) Appl. No.: 10/310,027

(22) Filed: Dec. 5, 2002

(51) Int. Cl.⁷ .............................. B64G 6/00; B63C 9/08
(52) U.S. Cl. .......................................... 600/20; 441/102
(58) Field of Search ................ 600/20, 2, 19; 441/104, 102, 90; 2/2.16, 82, DIG. 3, 79, 69; 604/289, 290; 5/423; 9/330; 128/201.29, 204.29; 204/26, 24, 29

(56) References Cited

U.S. PATENT DOCUMENTS

| | | |
|---|---|---|
| 2,379,497 A | 7/1945 | Sellmeyer |
| 2,495,316 A | 1/1950 | Clark et al. |
| 4,194,041 A | 3/1980 | Gore et al. |
| 4,583,522 A | 4/1986 | Aronne |
| 4,674,479 A | 6/1987 | Jennings et al. |
| 5,003,630 A | 4/1991 | Bassick et al. |
| 5,007,893 A | 4/1991 | Row |
| 5,027,437 A | 7/1991 | Reddemann et al. |
| 5,146,932 A | 9/1992 | McCabe |
| 5,153,938 A | 10/1992 | Epperson |
| 5,243,706 A | 9/1993 | Frim et al. |
| 5,458,516 A * | 10/1995 | Uglene et al. ............... 441/104 |
| 5,537,686 A | 7/1996 | Krutz et al. |
| 5,882,349 A * | 3/1999 | Wilkerson et al. .......... 604/289 |
| 6,134,714 A | 10/2000 | Uglene |
| 6,450,944 B1 | 9/2002 | Reinhard |

FOREIGN PATENT DOCUMENTS

| | | | |
|---|---|---|---|
| CA | 1021654 | 11/1977 | ................... 128/17 |
| CA | 1080072 | 6/1980 | ................... 128/37 |

* cited by examiner

*Primary Examiner*—Eric F. Winakur
*Assistant Examiner*—Nikita R. Veniaminov
(74) *Attorney, Agent, or Firm*—C. A. Rowley

(57) ABSTRACT

An anti-G pressure garment system incorporates an inflatable pressure bladder covering portions of the wearer's body. The bladder is provided with an area made of a first material formed by a flexible air and liquid impermeable, vapor permeable, micro-porous material that facilitates the passage of water vapor therethrough whereby pressurized gas will be retained by the said bladder and water vapor adjacent said inside layer will pass through said material into the interior of the bladder. The bladder also includes a second area made of liquid impermeable, air and water vapor permeable material so that the second area permits a preselected amount of controlled leakage from the bladder to the wearer while maintaining adequate pressure in the bladder.

16 Claims, 6 Drawing Sheets

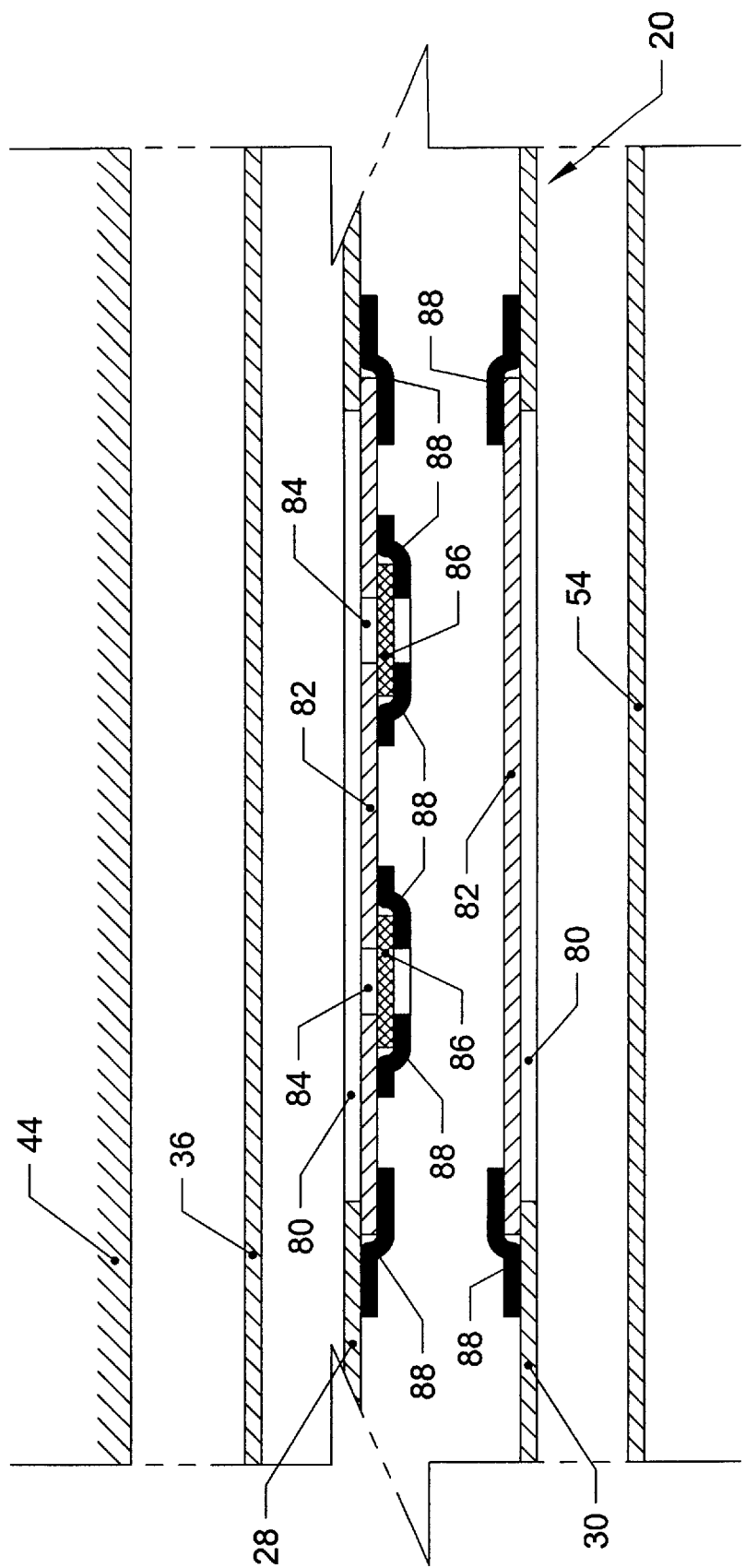

FLUID COOLED PRESSURE GARMENT

FIELD OF THE INVENTION

The present invention relates generally to pressure garments, and more particularly to lower body pressure garments such as anti-G suits of the type worn by aviators in high performance, high altitude aircraft or spacecraft.

BACKGROUND OF THE PRESENT INVENTION

Operators of performance, high altitude aircraft may be exposed to high levels of acceleration (+Gz acceleration) due to flight maneuvers such as rapid banked turns or pulling out of a dive. As a result of such maneuvers the operator's fluid column shifts causing pooling of blood in the lower extremities. The associated reduction of blood flow to the retina and brain in severe acceleration environments may cause the operator to experience increasingly diminished vision leading finally to loss of consciousness. To protect against such hazardous conditions, aviators in high performance aircraft typically wear pressure garments known as anti-G suits. Anti-G suits typically comprise a pair of cutaway trousers having bladders covering portions of the abdomen, thighs and ankles. The suit is connected to an anti-G valve in the aircraft that senses the onset of +Gz acceleration and opens to pressurize the anti-G suit bladders. The bladders are restrained against the aviators body so that upon inflation the suit compresses the contacted portions of the lower body causing an increase in the local blood pressure, thereby causing increased blood flow to the upper body and decreased blood flow to the lower body. Near the end of and shortly after WWII, the performance and altitude capabilities of aircraft improved such that aircrews could no longer sustain vision and sometimes consciousness throughout certain flight maneuvers. At that time anti-G pressure garments were developed to protect aircrews from the debilitating effects of high +Gz accelerations. An example of such pressure garments is U.S. Pat. No. 2,495,316 to Clarke, et al, which comprises impermeable inflatable bladders over the abdomen and thighs and a woven fabric covering to restrain expansion and apply pressure to body regions covered by the bladder. While the performance of modern military aircraft has been enhanced significantly over the past several decades, anti-G suit technology has remained largely unchanged. Because of this, the standard anti-G suit has limited capabilities for providing +Gz acceleration protection of the magnitude and duration that now occurs during flight maneuvers. In the totally unrelated fields of anti-shock and trauma treatments, pressure garments that apply distributed pressure loads to the lower body have been developed to reduce blood flow to the lower extremities similar to that required for anti-G protection. Examples of such pressure applying garments are U.S. Pat. No. 5,146,932 to McCabe, Canadian Pat. No. 1080072 to Gottfried and Canadian Pat. No. 1021654 to Poole et al. These garments are insufficient for anti-G protection in that they do not provide sufficient pressurization or an adequate means of active control of pressurization. Furthermore, these pressure garments are constructed primarily with impermeable materials that do not offer any means of thermal conditioning. The prior art has sought to increase anti-G protection in a number of ways but most particularly by increasing the body surface area compressed by the anti-G suit bladders. Examples of such efforts are U.S. Pat. No. 4,674,479 to Jennings et al, which, amongst other improvements, arranged a butt strap, integrated to the abdominal bladder of the conventional modern anti-G suit, so that the strap pulled tight to compress the aviator's buttocks upon inflation, and U.S. Pat. No. 5,537,686 to Krutz et al, describes a garment to provide full pressure coverage over the aviator's lower body.

Further attempts to maximize +Gz protection in high performance aircraft have included the use of water columns within the anti-G suit. Examples of such efforts are U.S. Pat. No. 5,153,938 to Epperson, and U.S. Pat. No. 6,450,944 to Reinhard, in which different configurations of water columns in suit systems are used to compress the body of the aviator. In such suit systems the hydrostatic pressure of said fluid column changes rapidly with the onset of +Gz acceleration and is directly proportional to and varies linearly with the internal pressure of the fluid column in the body.

Water column pressure garments also suffer from other deficiencies. The presence of water in the cockpit, in particular, is highly undesirable. Suits incorporating water columns tend to be significantly bulkier and heavier than the conventional pneumatic anti-G suit and require a burdensome amount of support in terms of suit fitting and sizing. To combat these deficiencies, the prior art has continuously reduced the amount of water contained in the columns of such a suit. However, this reduction has effectively diminished the physiological benefit realized from the pressurization of the water columns.

Although the prior art has demonstrated significant increase in +Gz protection over the current standard anti-G suit, the suit systems have introduced additional deficiencies including but not limited to reduced mobility, cockpit interference, excessive thermal burden and enhanced logistical burdens such as maintenance and reliability. In particular, pneumatic pressure garments are typically constructed with air, liquid water and water vapor impermeable, solid film laminate materials for the retention of gas under pressure. Whereas such materials are extremely effective as gas barriers, they also act as a barrier to water vapor, thereby inhibiting the natural dissipation of the aviator's evaporated perspiration and therefore further act as a barrier to metabolic heat loss. Thus the prior art has enhanced +Gz protection through the increase of pressure bladder coverage on the lower body, this has exaggerated the thermal barrier problem.

Complex and burdensome cooling systems have been integrated to anti-G garment systems to combat thermal stress. Flexible air and liquid impermeable, water vapor permeable material of the type disclosed in U.S. Pat. No. 4,194,041 to Gore et al, has been used for pressure garment constructs as disclosed in U.S. Pat. No. 5,003,630 to Bassick et al. Such materials consist of an interior hydrophilic layer, which prevents flow of gases or liquids but permits the transfer of high concentrations of water vapor that diffuse to the exterior hydrophobic layer where the vapor concentration is relatively lower. A bladder constructed from such materials offers benefit over the said conventional bladder constructs, however, the prior art relies solely on the passive diffusion of water vapor from the garment microenvironment to provide cooling to the aviator, which is insufficient for current aircrew clothing systems that comprise many layers of fabrics.

In the related field of thermal conditioning of burdensome garment systems, air cooling garments have been developed such as that disclosed in U.S. Pat. No. 5,243,706 to Frim et al. The said "micro-climate conditioning system" incorporates an impermeable yet porous bladder that distributes air over regions of the wearer's body. Although such a garment does inflate to a relatively low pressure during operation, little or no control of pressure is conceivable in the disclosed configuration and is not suitable as an anti-G protective pressure garment. In U.S. Pat. No. 6,134,714 to Uglene, a personal cooling garment is disclosed in which a liquid filled, air and water impermeable, water vapor permeable bladder is retained tightly against the wearer. As air is passed over the bladder, the internal liquid may evaporate thus drawing heat from the wearer. While it is conceivable that such a garment could be so arranged as an anti-G suit, in the disclosed form it bears no relevance to acceleration protection.

In addition to negatively enhancing thermal burden on aircrew members, the prior art related to acceleration protection, has, in many cases, increased the bladder size and shape in such pressure garments to the degree that over expansion has become a problem. In particular, some of the said pressure garments interfere with critical cockpit controls when in the full pressure mode. U.S. Pat. No. 4,674,479 to Jennings et al, teaches the use of rigid stiffeners over the entire bladder envelope to resist expansion, however, the actual shape of the inflated profile of these pressure garments has not been effectively addressed.

SUMMARY OF THE INVENTION

The present disclosure describes an improved fluid cooled pressure (anti-G) garment that can effectively reduce disadvantages inherent in currently used garments for example the thermal burden, cockpit interference, sizing adjustment, and/or maintenance and repair issues.

The main objective of the present invention is to provide an active means of cooling wearer of a pressure garment such as anti-G suits worn by aircrew members of high performance, high altitude aircraft.

A secondary objective is to further reduce the passive thermal burden due to excessive bulk in the garment system.

Broadly the present invention relates to a pressure garment particularly suited for use as an anti-G suit comprising an inner layer facing towards a wearer and an outer layer, said inner and outer layers being connected together to form an air pressure holding bladder, means providing at least one area made from air impermeable, water vapor permeable material defining a first passage means for water vapor through said inner layer and means defining at least one other area made from air and water vapor permeable material defining a second passage means for air and water vapor through said inner layer.

Preferably, said bladder is received within a pocket form between an external restraint layer and an inner lining layer positioned adjacent to said inner layer of said bladder, said external restraint layer being formed a material to limit expansion of said bladder under inflated condition.

Preferably pass throughs are provided through said inner lining through which said bladder may be inserted into said pocket.

Preferably, garment further includes releasable connector means connecting said bladder inside said pocket.

Preferably said outer layer is also provided with at least one area formed from of air and liquid impermeable, water vapor permeable material to provide some of said first passage means through said outer layer.

Preferably said inner and outer layers are made from air impermeable, water vapor permeable material that forms said first passage means.

Preferably, said garment further includes secondary restraint means composed of spaced strapping encircling said bladder and positioned between said bladder and said external restraint.

Preferably the garment further comprises limiters interconnecting said inner and outer layers at spaced locations to limit expansion of said bladder in said spaced locations.

BRIEF DESCRIPTION OF THE DRAWINGS

Further features, objects and advantages will be evident from the following detailed description of the preferred embodiments of the invention in which:

FIG. 3 is a schematic illustration of a cross section through a bladder of the present invention showing the breathing patches for air and/or water vapor passage through the walls of the bladder.

DESCRIPTION OF THE PREFERRED EMBODIMENTS

Figure 1:
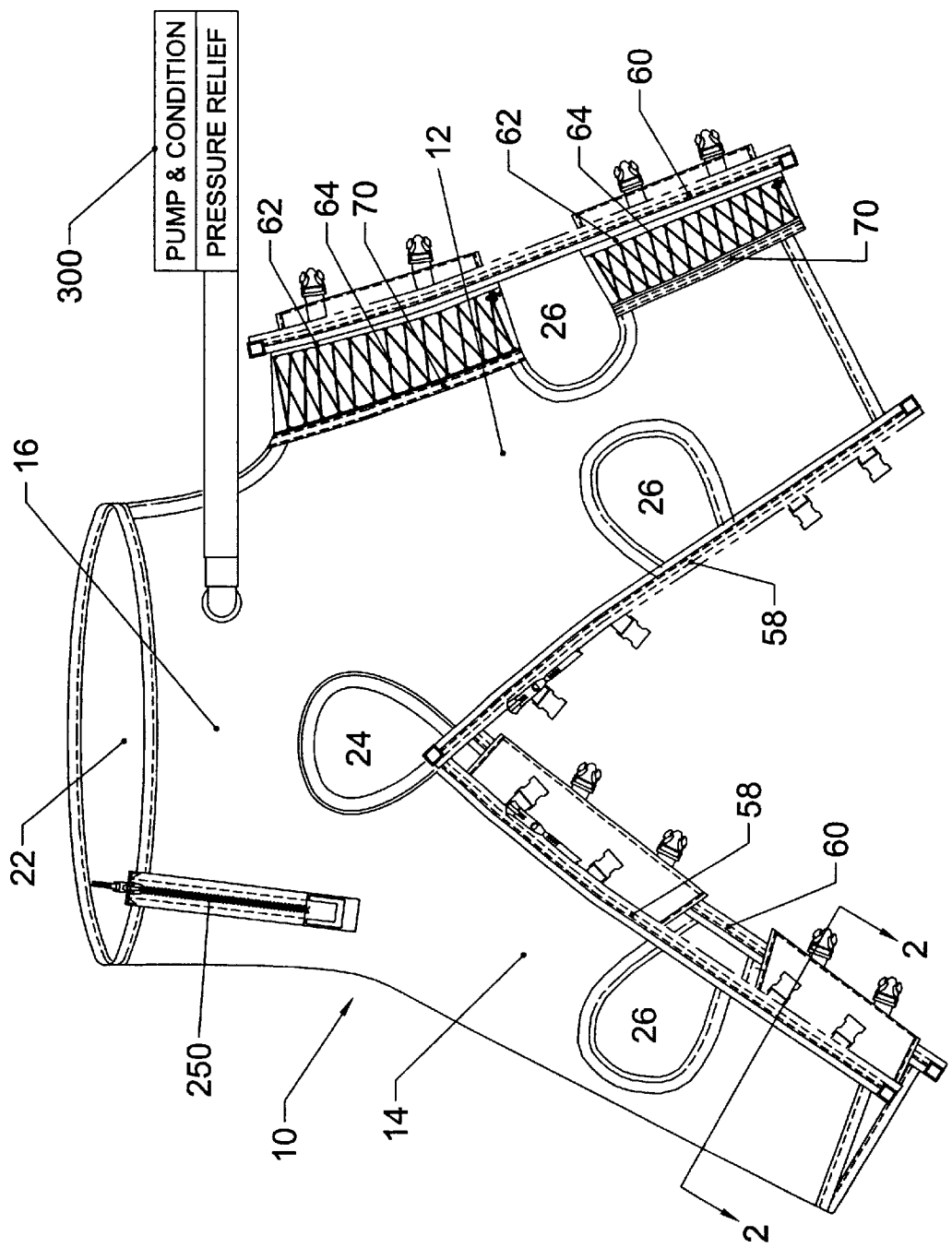
FIG. 1 is a front view of a preferred form of the garment system of the present invention showing the leg on the viewer's right in the drawing in open position and the leg on the left in position on a leg.

Referring now to FIG. 1 the ant-G suit 10 of the present invention is shown as a suit 10 having a pair of leg encircling portions 12 and 14 and a lower torso-encircling portion 16. As will be described a suitable inflatable bladder 20 (a single bladder is preferred but multiple interconnected bladders or separate discrete bladders interconnected by tubing and/or valves may be used to inflate different sections or areas of the garment 10). The bladder 20 extends over most of the area of the garment 10 on both the front and back of the suit 10 with the exception of the butt area 22, the crotch area 24 and the knee areas 26 i.e. the bladder 20 extends along and encircles the legs 12 and 14 from the bottom (ankle area) up to the upper thighs and the pelvis area up to about the waist in the front and terminates at the upper thighs leaving the butt area free from the pressure applying bladder 20. The knee and crotch areas 26 and 24 are essentially open areas free of material i.e. the garment 10 in the preferred embodiment does not cover the knee 26 or crotch areas 24.

Figure 2A:
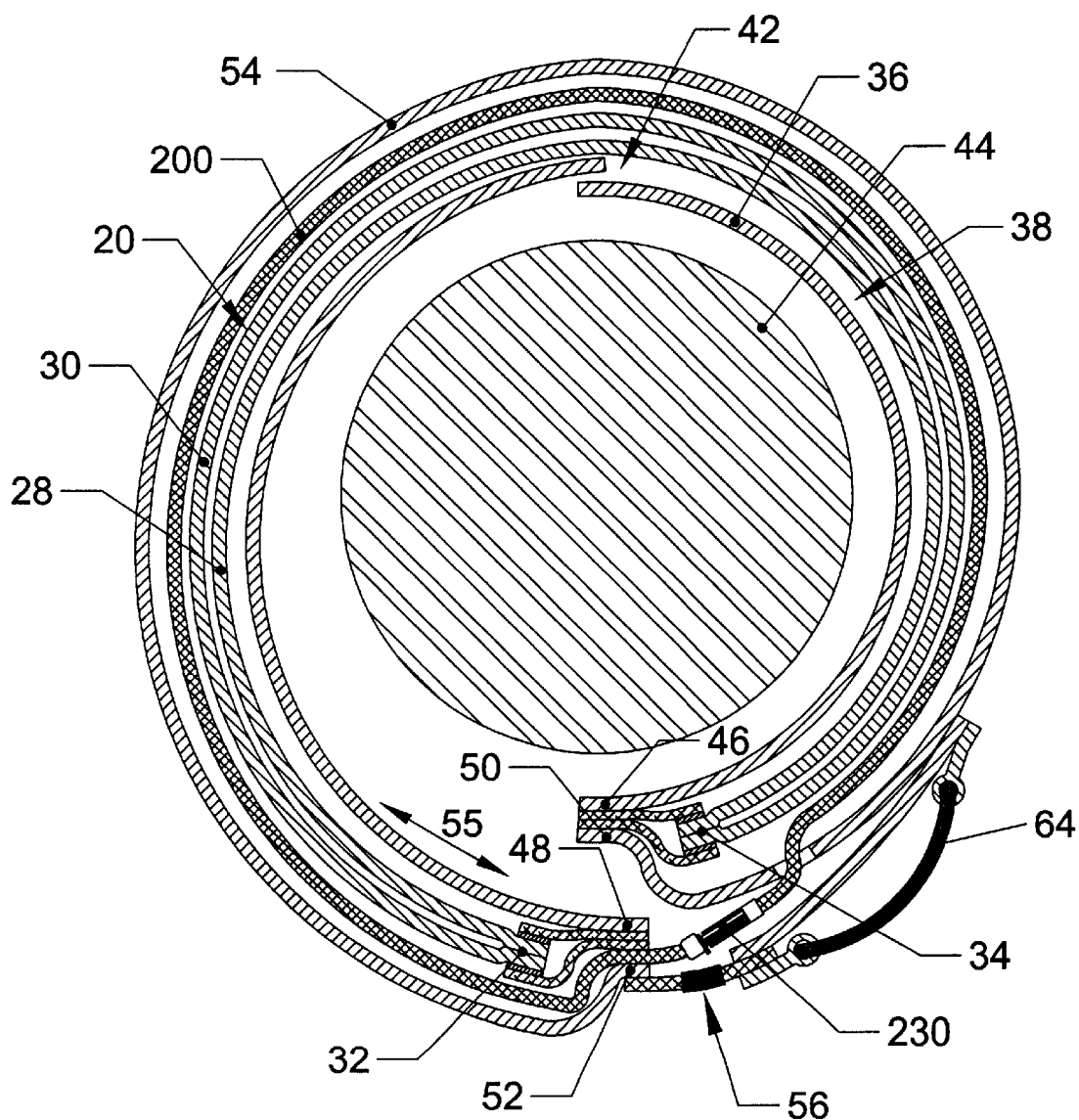
FIG. 2A is a schematic cross section on the line 2—2 of FIG. 1 showing the various layers of the garment of the present invention.
Figure 2B:
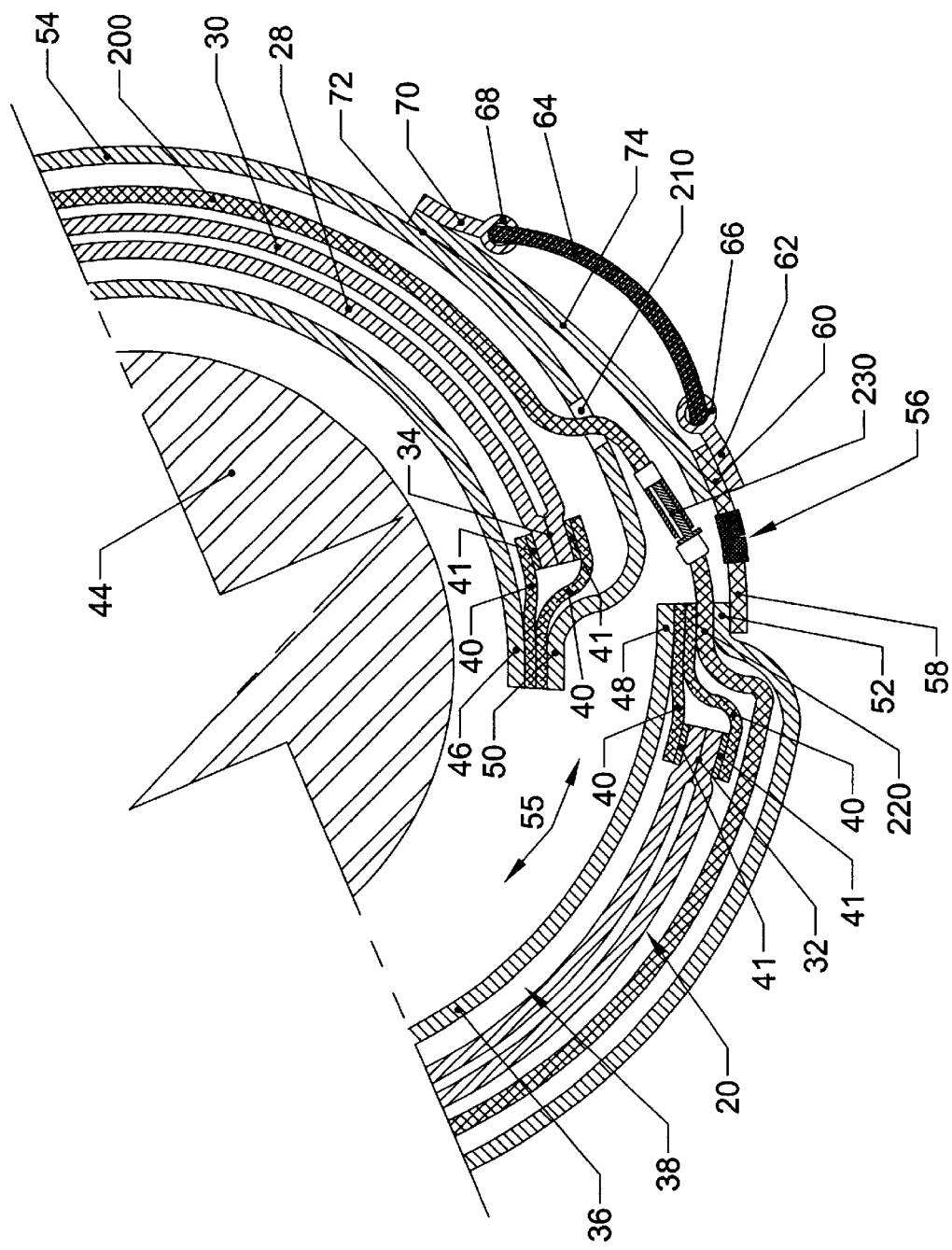
FIG. 2B is a detail view of part of the schematic cross section of FIG. 2A.

As shown in FIG. 2 the pressure holding bladder 20 of the anti-G garment 10 has an inner layer 28 and outer layer 30 sealed together preferably by welding or some other heat sealing or securing process around their peripheries as indicated for example by the seals 32 and 34 to form the air pressure holding bladder 20.

A liner layer 36 combines with an outer or external restraint layer 54 (described below) to define a pocket 38 there between and in which the bladder 20 is positioned. The inner layer 36 is provided with at least one pass through as indicated at 42 which may be formed by a slit in the layer 36 and that functions to provide a passage for positioning the bladder in the pocket 38 This gap 42 in the lining construction permits the bladder 20 to be installed and removed from the pocket 38 without removing any seams. Current bladder replacement procedures take in the order of several hours, this simple change combined with the releasable connector means 40 described below facilitates changing a bladder which now may be achieved in a matter of several minutes.

The releasable connector 40 (see FIGS. 2A and 2B) for releasably holding the bladder 20 in the pocket 38 is preferably formed by loop fastener strips 40 (for example VELCRO® type fasteners) sewn or otherwise secured into the bladder pocket 38 between the seams between the restraint layer 54 ends 50 and 52 and lining layer 36 ends 46 and 48 and cooperating fastener elements 41 are secured to the bladder 20 at appropriate locations. These strips 40 and cooperating elements 41 are positioned at spaced locations around the periphery of the pocket 38 and bladder 20 as required to releasably secure the bladder 20 in the pocket 38.

The sides or ends 46 and 48 of the liner 36 are connected to, adjacent ends 50 and 52 respectively of the outer restraint layer 54 that encircles the body part 44 (in FIGS. 2A and 2B the shin) to form the above-described pocket 38.

The material from which the liner 36 is constructed permits the easy passage of air and/or water vapor between the wearer 44 and the inner layer 28 of the bladder 20. However, the lining material should have sufficient strength to assist in restraining expansion of the bladder 20 should the suit come off, for example, the user's leg.

The outer covering or restraint layer 54 may be made from any suitable material having physical characteristics to restrain the expansion of the bladder and generally will having very low stretch and high tear strength properties as defined by the user and will probably be in the form of a woven fabric, for example as described in Military Standard MIL-C-83429B As shown in FIG. 2 one chain extension or stringer (one side of a zipper) 58 of zipper 56 is secured along the end edge 52 of the layer 54 that is secured to the end 48 of the liner 36 and the other chain extension or stringer (the other side of a zipper) 60 of zipper 56 is secured to a lacing tape 62 that is laced by a lace 64 passing through suitable eyelets 66 in the lacing tape 62 at one side and through eyelets 68 of lacing tape 70 at the other side and which tape 70 is secured to the restraining cover 54 by a seal or seam or the like 72 spaced from the end 50 by a distance which provides for degree of size change to be accommodated by tightening and/or loosing the lace 64.

In other words the overlap of the ends 50 and 52 of the external layer 54 is adjustable as indicated by the arrow 55 to accommodate different sized body parts 44 and is adjustable via the adjustment of the lacing panel 64 which in turn adjusts the location of the zipper half 60.

A suitable backing strip 74 is connected at one end to the layer 54 and the other end connected to the chain extension 60 and lacing tape 62 and is imposed between the lace 64 and the adjacent surface of the layer 54.

Turning to FIG. 3, the inner layer 28 and outer layer 30 of the bladder 20 in the illustrated embodiment are formed from air, liquid and water vapor impermeable material with cutaway sections (holes) as indicated at 80 through the inner layer 28 normally positioned in regions located over the thighs and ankles when the garment is in place on the wearer. At least one first patch area 82 formed by a first patch material covers or closes the cut away section(s) 80. These first patches define first areas that provide first passages are as above indicated formed by a first material, which is an air impermeable, water vapor permeable material. In practice this first material will likely also be liquid, particularly water, impermeable since most commercially available material used for this purpose is liquid impermeable.

If desired similar first patches may be provided in openings 80 formed in the outside layer 30 to facilitate movement of water vapor from inside the bladder to the outside as will be described below.

The first patch area 82 on the inner layer 28 (not on the outer layer 30) is provided with a second set of at least one cutaway sections or holes 84 which are closed by at least one second patch area 86 formed from a second patch material which is an air and water vapor permeable to provide second passages for air and water vapor. It will be apparent that while the second patch areas 86 are shown as applied to the first patch areas 82 the second patch areas 86 could also be applied to their own discrete holes in the inner layer 28. In practice this second material will likely also be liquid, particularly water, impermeable since most commercially available material used for this purpose is liquid impermeable.

In the illustrated arrangement the first patches 82 are held in place on the layer 28 (and layer 30 if provided on that layer) by suitable flexible seaming tape 88 extending around their circumference and similarly the second patches 86 are secured in place by similar strips of seaming tape 88 extending around their peripheries. Obviously other suitable means may be used to secure the first and second patches in place in the bladder 20.

The bladder 20 could be constructed entirely from flexible air impermeable, water vapor permeable material to provide first passages for water vapor throughout substantially to whole area of the bladder layers 28 and 30 and thereby maximize the area available for water vapor passage into and out of the bladder 20 through the bladder walls. For example the air impermeable, water vapor permeable first material as used to form the first patches of passages 80 may be formed into a bladder 20 by sealing around the periphery of the bladder 20 with a flexible heat sealable tape or by other suitable means. In this constructions hole 84 would simply be provide through the inner layer of the bladder 10 and these holes 84 closed by patches 86 as described above.

Figure 4:
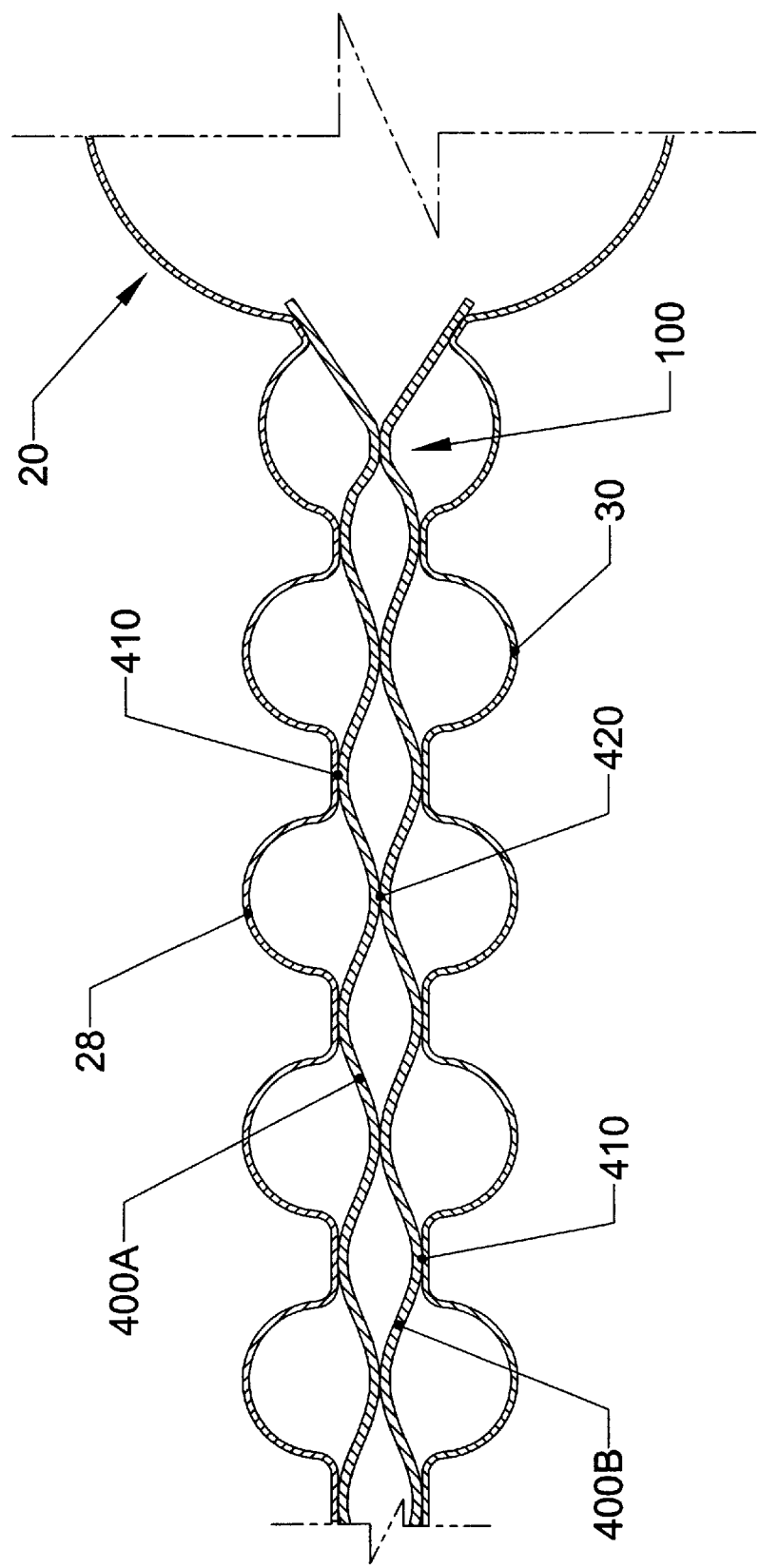
FIG. 4 illustrates a reinforcing connector interconnecting the inside and outside layers of the bladder to limit expansion therebetween.

The amount of area providing water vapor passages (first passages) generally can be maximized, as these areas, since they are air impermeable, do not materially change the ability of the bladder 20 to hold air pressure. The area of the second passages (air and water vapor passages) must not be too large or it will be impossible to maintain the required pressure within the bladder under all operating conditions. Thus though it is desirable to maximize the amount of air flowing through the passages 84 to the body of the wearer this area will be determined by the capacity of the on board air supply. Generally under conventional conditions it is essential that the bladder be able to hold a pressure of at least about 12 pound per square inch (psi) under all operating conditions. Thus the number of liquid impermeable, air and water vapor permeable regions as defined by the second patches or passages 86, and the corresponding surface area, is chosen so that the pressurized air supply provides sufficient airflow throughout the entire operating pressure regime to provide adequate +Gz protection. Additionally, the bladder 20 is preferably provided with expansion limiters 100 as shown in FIG. 4. These limiters 100 are strategically positioned at spaced locations between the inner and outer layers 28 and 30 of the bladder 20 and interconnect the adjacent faces of the layers 28 and 30 to internally restrain the layers 28 and 30 from outward expansion away from the wearer.

Preferably the internal expansion limiters 100 comprise flexible yet substantially non-stretchable panels 400A and 400B that are connected together at spaced locations by suitable seams 420. The panel 400A in the illustrated arrangement is connected to the inner bladder layer 28 by seals or connections 410 interposed between the seams 420 (preferably midway between the seams 420 and similarly the other panel 400B is secured to the outer bladder layer 30 by seals or connections 410 interposed between the seams 420 (preferably midway between the seams 420. Preferably the limiters 100 is made of a flexible heat sealable material and the seams 420 are the stitches between the two panels 400A and 400B and the seals or connections 410 are the heat seal (weld) bonds to the inner and outer layers of the bladder. Said limiters could be made from a material that is seamed to the bladder walls using a flexible seam tape or the like.

Figure 5:
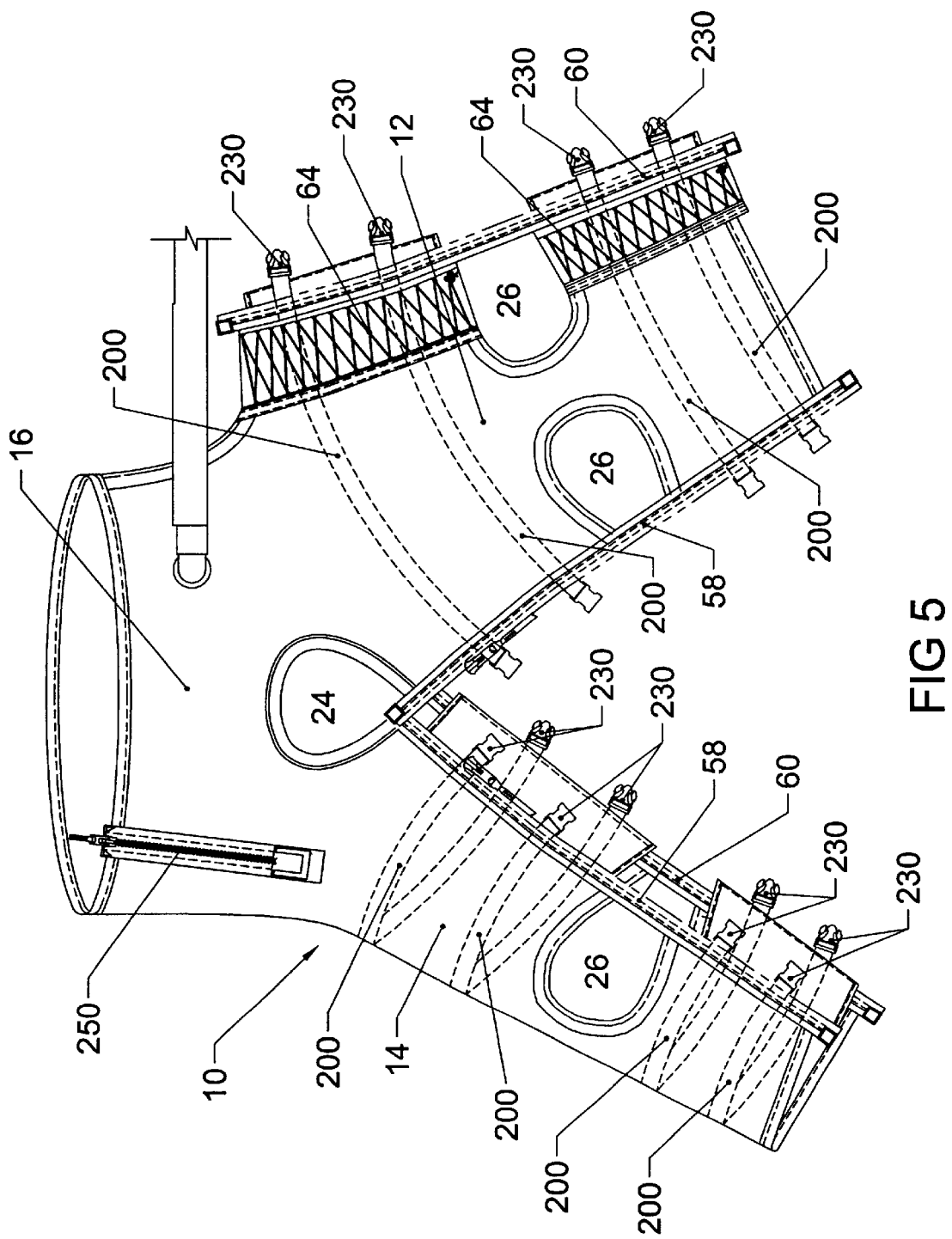
FIG. 5 is a front view of the present invention schematically illustrating typical locations for the secondary restraining straps.

Referring back to FIG. 2 and FIG. 5 secondary restraints are normally provide as indicated at 200. These restraints are in the form of belts or straps each of which encircles the leg and that are strategically located at spaced intervals along the thighs and ankles. (See FIG. 5) Each strap 200 is positioned between the outer layer 30 of the bladder 20 and the outer restraining layer 54 and one end of which passes to the outside of the layer 54 through suitable aperture 210 formed through the layer 54 adjacent to the end 50 and the opposite end through an aperture 220 through the joint between the ends 48 and 52. Each belt 200 provided with an adjusting buckle 230 to adjust the circumference or tightness of the belt 200 around the wearer 44. These straps 200 thus form individually adjustable reinforcing elements to locally resist expansion of the bladder 20. These straps or belts 200 are intended to prevent uncontrolled inflation of the bladder if the primary restraint 54 were to have a catastrophic failure. Zippers have also failed causing the bladder 20 to unravel from the leg and expand to full volume in the cockpit and the secondary restraints protect against that.

The external restraint layer 54 may additionally incorporate features such as slide fasteners as indicated at 250 (see FIG. 1) that are use to open the garment for donning and doffing.

Pockets and other accessories may also be attached to the external restraint layer 54. Referring back to FIG. 1, the system includes an air inlet and outlet for flow of air into and exhaust from the bladder 20. The bladder is pressurized with pressurized airflow controlled by the air pump and conditioning system 300 that includes the normal pressure release and computer controls to regulate the flow of air to maintain the required pressure in the bladder to compensate for +Gz accelerations encountered and to circulate the required amount of conditioned air to provide the conditioned air to the wearer through the passages 86 (while maintaining the required pressure in the bladder 20 and carry away water vapor that enters the bladder 20.

In operation when airflow, that is cooler and drier relative to the conditions of the garment micro-environment within the bladder 20, water vapor that is absorbed through the inner layer of the bladder patch area 82 and 86 from the wearer's body is actively flushed from the bladder 20 thus promoting continuous and sustainable transport of water vapor away from the wearer's body. Simultaneously, the liquid impermeable, air and water vapor permeable regions 84 bleed air to the skin of the wearer at a rate directly proportional to the bladder pressure. The air permeability of the areas 86 is aircraft and pressure schedule dependent.

When the garment is worn with the restraining layer 54 loose some of the water vapor entering the bladder through the passages in the inside layer 28 is dispensed to the outside through the passages 82 through the outside layer 30.

The flow of air from the bladder 20 through the passages 86 to the wearer's skin enhances evaporation of the liquid sweat thereby further increasing the metabolic heat loss of the wearer and improving thermal comfort due to drying. This air escapes from between the wearer and the garment 10 (liner layer 36) around the edges of the garment 10 e.g. at the leg end and waist end openings to the garment and the crotch and knee openings 24 and 26.

The number of liquid impermeable, air and water vapor permeable regions, and the corresponding surface area, is chosen as above described so that the pressurized air supply provides sufficient airflow throughout the entire operating pressure regime to provide adequate +Gz protection.

Having described the invention modifications will be evident to those skilled in the art without departing from the scope of the invention as defined in the attached claims.

We claim:

1. A pressure garment particularly suited for use as an anti-G suit comprising an inner layer facing towards a wearer and an outer layer, said inner and outer layers being connected together to form an air pressure holding bladder, means providing at least one area made from air impermeable, water vapor permeable material defining a first passage means for water vapor through said inner layer and means defining at least one other area made from air and water vapor permeable material defining a second passage means for air and water vapor through said inner layer.

2. A pressure garment as defined in claim 1 wherein said bladder is received within a pocket form between an external restraint layer and an inner lining layer positioned adjacent to said inner layer of said bladder, said external restraint layer being formed a material to limit expansion of said bladder under inflated condition.

3. A pressure garment as defined in claim 2 wherein said air impermeable, water vapor permeable material and air and water vapor permeable materials are liquid water impermeable materials.

4. A pressure garment as defined in claim 2 wherein pass throughs are provided through said inner lining through which said bladder may be inserted into said pocket.

5. A pressure garment as defined in claim 4 further comprising releasable connector means connecting said bladder inside said pocket.

6. A pressure garment as defined in claim 5 further comprising secondary restraint means composed of spaced strapping encircling said bladder and positioned between said bladder and said external restraint.

7. A pressure garment as defined in claim 5 wherein said outer layer is also provided with at least one area formed from of air impermeable, water vapor permeable material to provide some of said second passage means through said outer layer.

8. A pressure garment as defined in claim 4 further comprising secondary restraint means composed of spaced strapping encircling said bladder and positioned between said bladder and said external restraint.

9. A pressure garment as defined in claim 4 wherein said outer layer is also provided with at least one area formed from of air impermeable, water vapor permeable material to provide some of said second passage means through said outer layer.

10. A pressure garment as defined in claim 4 further comprising limiters interconnecting said inner and outer layers at spaced locations to limit expansion of said bladder in said spaced locations.

11. A pressure garment as defined in claim 2 further comprising secondary restraint means composed of spaced strapping encircling said bladder and positioned between said bladder and said external restraint.

12. A pressure garment as defined in claim 6 further comprising limiters interconnecting said inner and outer layers at spaced locations to limit expansion of said bladder in said spaced locations.

13. A pressure garment as defined in claim 2 wherein said outer layer is also provided with at least one area formed from of air impermeable, water vapor permeable material to provide some of said first passage means through said outer layer.

14. A pressure garment as defined in claim 2 further comprising limiters interconnecting said inner and outer layers at spaced locations to limit expansion of said bladder in said spaced locations.

15. A pressure garment as defined in claim 1 wherein said outer layer is also provided with at least one area formed from of air impermeable, water vapor permeable material to provide some of said second passage means through said outer layer.

16. A pressure garment as defined in claim 1 further comprising limiters interconnecting said inner and outer layers at spaced locations to limit expansion of said bladder in said spaced locations.

* * * * *